April 28, 1970                R. P. LYNCH                3,508,410
              SUBMERGED PIPELINE REPAIR SYSTEM
Filed Oct. 30, 1968                              2 Sheets-Sheet 1

INVENTOR
ROBERT P. LYNCH
BY
ATTORNEY

April 28, 1970  R. P. LYNCH  3,508,410
SUBMERGED PIPELINE REPAIR SYSTEM

Filed Oct. 30, 1968  2 Sheets-Sheet 2

INVENTOR
ROBERT P. LYNCH
BY Leo A. Plum, Jr.
ATTORNEY

3,508,410
SUBMERGED PIPELINE REPAIR SYSTEM
Robert P. Lynch, Alexandria, Va., assignor to Ocean Systems Incorporated, New York, N.Y., a corporation of New York
Filed Oct. 30, 1968, Ser. No. 771,908
Int. Cl. B63c *11/00*
U.S. Cl. 61—69                                              6 Claims

ABSTRACT OF THE DISCLOSURE

In an underwater repair chamber adapted to straddle a submerged pipeline and having supply lines for introducing a pressurized gas to displace any water therein and maintain the same in a dry condition, the improvement comprising separate clamping mechanisms, such as pressure actuated cylinders and pistons, located externally of the chamber and mounted at each end of a rigid support structure for engaging the pipeline on opposite sides of the chamber to prevent any movement of the pipeline. The system is particularly effective in applications where it is necessary to sever a pipeline by cutting away a damaged section and replacing it with a new section. Preferably, the clamping mechanisms are self-adjusting to minor horizontal and vertical bends in the pipeline.

Background of the invention

This invention relates to underwater repair systems and more particularly to underwater repair systems having chambers of the type adapted to straddle a submerged pipeline and having means for displacing the water therefrom in order to maintain the same in a dry condition. More particularly, this invention relates to an underwater repair system which enables divers to perform both minor and major repair work on a pipeline.

While prior art repair chambers are satisfactory for performing routine repair work on an isolated section of pipeline, they are not well suited for applications wherein it is required to sever a pipeline by cutting away a damaged section and replacing it with a new section. One reason for this is that submerged pipelines frequently are subjected to great stresses caused by storms and/or currents as well as dragging anchors from surface vessels. Upon severing a section of pipeline subjected to these great stresses, the ends of the pipe may suddenly swing as the stress is released. Not only can this present a serious safety hazard to the occupants within the chamber but, in addition, movement of the pipe ends will usually cause misalignment and make it extremely difficult to install a new section to replace the damaged one. In the past, such pipeline repairs have been effectively made only by lifting the pipeline to the surface, straddling a barge, severing and removing the damaged pipe section, and welding a replacement section to the free ends. This procedure is, however, time consuming and very expensive.

Objects

It is an object of the invention to provide an underwater repair system for pipelines and the like, enabling the cutting away of a damaged section and the replacement of a new section. Another object of the invention is to provide an underwater repair system including an open-bottomed chamber adapted to straddle a damaged section of pipeline, and including means for preventing movement of the exposed ends of the pipeline when the damaged section is severed and removed. Still another object of the invention is to provide an underwater repair system, including an open-bottomed chamber, which is capable of repairing a curved or bent section of pipeline. Yet another object of the invention is to provide an underwater repair system having means for producing a vertical movement of a pipeline.

Summary of invention

According to the invention, an improvement is provided in an apparatus including an open-bottomed chamber adapted to straddle a section of submerged pipeline and having means for introducing a pressurized gas into the chamber in order to maintain the interior thereof in a substantially dry condition. The improvement comprises separate pipe clamping means located externally of the chamber, on opposite sides of the chamber, and mounted on each end of a rigid support structure for engaging the pipeline and preventing any movement of such pipeline, when a damaged section is cut away.

The drawings

Figure 1:
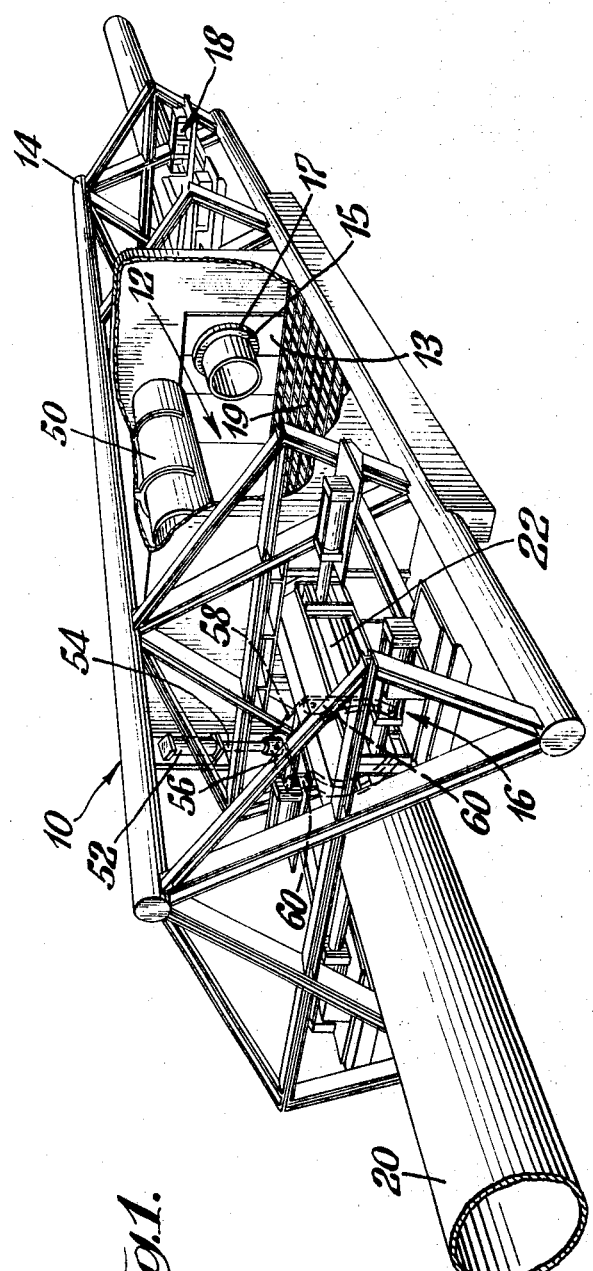
FIGURE 1 is a perspective view of the underwater repair system of the invention including the truss structure and the repair chamber, a portion of such chamber being broken away to expose a part of the interior thereof.

Referring to FIGURE 1 there is shown the underwater pipeline repair system 10 of the invention which generally includes a repair chamber 12 positioned within a truss structure 14 and located between identical pipe clamping mechanisms 16 and 18. Repair chamber 12 is provided with a set of doors 13 at each end of such chamber 12 having circular openings 15 and sealing rings 17. An adjustable deck grating 19 covers the bottom of chamber 12. Pipe clamping mechanisms 16 and 18 are mounted respectively near each end of truss structure 14 and are designed to locate a pipeline 20 at the intersection of the maximum and minimum transverse neutral axis of the structure 14. Each pipe clamping mechanism 16, 18 consists of two elongated shoes 22, each of which is mounted in a position on opposite sides of pipe 20. As shown in greater detail in FIGURE 2, shoes 22 have an arcuate-shaped cross section which is sized so that surfaces of shoes 22 will be placed in intimate contact with the external surface of pipe 20. When shoes 22 are compressed against pipe 20 by linear actuator mechanisms, such as hydraulic cylinders 24. It is to be understood that other types of pressure-actuated pistons and cylinders can be suitably employed, such as a pneumatic actuator. It is also to be understood that the truss structure 14 can be made of pipes, bars, beams, or combinations thereof, which form a rigid support structure.

Figure 4:
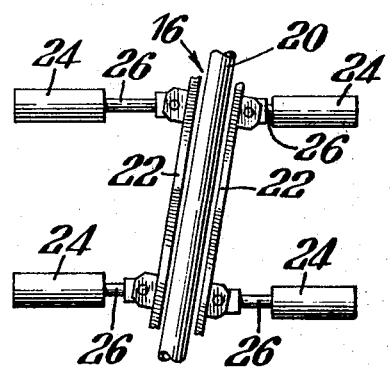
FIGURE 4 is a plan diagrammatic view of two pair of clamping shoe actuator mechanisms and their respective clamping shoes, illustrating the manner in which the shoes can adjust for horizontal bends in a pipeline.

As shown in FIGURES 1 and 4, each clamping mechanism 16, 18 consists of a pair of clamping shoes 22. Each shoe 22 is manipulated by two hydraulic actuators 24 located at opposite ends of the shoe 22. The cylinders 24 in each pair are positioned so that the shoes 22 engage opposite sides of the pipeline 20. A diver operated hydraulic system clamps the shoes 22 to the pipe 20 and then locks the actuators 24 in such clamped position.

Clamping mechanism 16, 18 is designed to self-seat the shoes 22 automatically onto any pipe which is in an overbend, sagbend, side bend, or any combination thereof.

Figure 2:
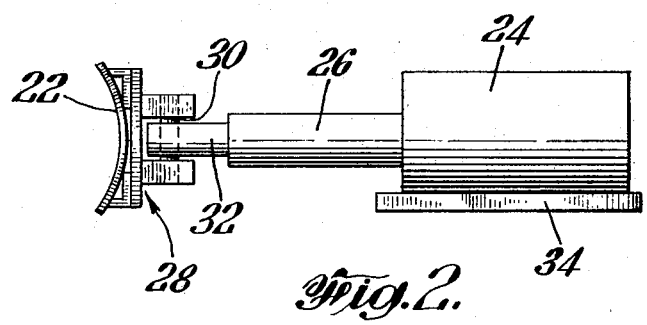
FIGURE 2 is a side view of a clamping mechanism for engaging one sidewall of a pipeline.
Figure 3:
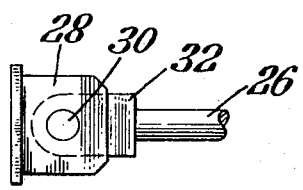
FIGURE 3 is a plan view of the mounting bracket for the clamping shoe including the pivot pin connection between the bracket and the piston shown in FIGURE 2.

FIGURES 2 to 4 illustrate the pivotal connection between clamping shoes 22 and their respective hydraulic cylinders 24 which provide a self-adjusting action in the clamping mechanism 16 to accommodate bends in the pipeline 20 about a vertical axis. More specifically, the cylinder shaft 26 of hydraulic cylinder 24 is pivotally connected to the mounting bracket 28 of shoe 22 by means of pivot pin 30 and eye bracket 32. Eye bracket 32 is firmly attached to cylinder piston or shaft 26, such as by threaded engagement therebetween.

Figure 5:
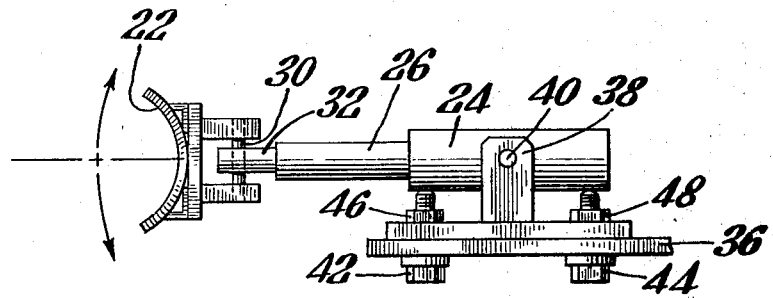
FIGURE 5 is a side view similar to FIGURE 2 but showing a preferred means of mounting the actuator cylinders to the truss structure shown in FIGURE 1.

While the hydraulic cylinders 24 can be fixedly attached to a mounting plate 34 on the truss structure 14, it is preferred to mount the cylinders 24 on the truss structure 14 by means of a pivoal connection which permits the clamping mechanism 16 to adjust to accommodate minor vertical bends in the pipeline 20 about a horizontal axis. Referring to FIGURE 5, hydraulic cylinder 24 is connected to the mounting plates 36 on truss structure 14 by means of a trunnion bracket 38 which is fixedly attached to mounting plates 36 and a trunnion pin 40. Pivotal movement of cylinder 24, and hence shoe 22, about trunnion pin 40 is limited by the setting of two bolts 42 and 44 and their cooperating nuts 46 and 48. The end of the stems of bolts 42 and 44 can be positioned to abut with cylinder 24 as desirable positions of rotation of cylinder 24 about trunnion pin 40, thereby acting as an adjustable lock when the shoe 22 grips the pipeline 20.

Operation of the underwater pipeline repair system 10 of the invention is initiated after the system is lowered by a control buoyancy technique to a position where it rests on top of the pipeline 20. Shoes 22 are retracted, chamber doors 13 are opened and the chamber dock grating 19 is raised to permit system 10 to be lowered into the operative position shown in FIGURE 1. As system 10 is lowered, the upper portion of chamber 12 and the volumes of buoyancy tanks, not shown are dewatered by compressed gas to reduce the submerged weight of the system. Hydraulic and compressed air supply lines, electrical and welding cables, and the divers air lines are not shown in the drawings. With system 10 in the operative position, hydraulic cylinders 24 are actuated causing shoes 22 to grip the pipeline 20. Trunnion locking nuts 46 are tightened to provide a desirable setting of the bolts 42 and 44. Chamber doors 13 are then closed and sealed to pipeline 20 by sealing rings 17, and deck grating 19 is lowered. Chamber 12 can now be fully dewatered and the buoyancy tanks simultaneously flooded to offset the buoyancy forces created in chamber 12.

Any materials covering the pipeline, such as concrete and resin coatings, are removed from the pipeline 20 at the surface areas intended for cutting and welding. When pipeline 20 is cut on either side of the damaged area, the forces released are transmitted to truss structure 14 through clamping mechanisms 16 and 18, which grip both ends of pipeline 20 rigidly and restrain them from movement when such pipeline 20 is cut. Truss structure 14, in effect, replaces the removed section of pipeline 20. Furthermore, truss structure 14 is designated to have greater structural strength than the pipeline 20 under repair so that it restrains the same from significant movement. After pipeline 20 is cut, the truss structure 14 bears all the possible loads, such as axial tension, axial compression, and bending moments about any plane. After the damaged section of pipeline 20 is removed the ends of pipeline 20 are beveled for welding. A replacement pipeline section 50 is lowered into position between the ends of pipeline 20 and welded thereto. Before the welding operation the atmosphere of chamber 12 can be diluted with nitrogen to provide a firesafe environment. After repairs of pipeline 20 are completed, the buoyancy tanks are dewatered and chamber 12 is flooded by removal of pipe seals 17. Doors 13 are opened, deck grating 19 is retracted from its floor position, and each pipe clamping mechanism 16, 18 is opened to permit the system 10 to be lifted to the water surface.

The rigid restraints maintained by truss structure 14 on pipeline 20 enable the system of the invention to meet the close alignment standards required by industry for the removal and replacement of pipeline sections. A substantial savings in repair time and cost results since a permanent replacement section of pipeline is installed underwater, thereby avoiding the necessity for lifting a long pipeline to the water surface and straddling a barge before the damaged section is removed and replaced. Furthermore, the above-discussed self-adjusting features of the clamping mechanism 16, 18 enable the system 10 to accommodate minor bends in pipeline 20.

In some instances it may be desirable to manipulate the pipeline 20 with respect to the chamber 12 so as to facilitate alignment and subsequent welding of the joints inside such chamber 12. For this purpose, at least one linear actuator mechanism, such as hydraulic cylinder 52 shown in FIGURE 1, is provided. Cylinder 52 is mounted in a vertical position on truss structure 14. The piston or shaft 54 of cylinder 52 is mechanically connected to clamping shoes 22 through a shaft collar 56 which is attached to a yoke 58. Yoke 58 is pivotally connected at each end to a pair of links 60 which are each attached to a respective clamping shoe 22. Cylinder 52 can be actuated to raise or lower the pipeline 20 to aid in top and bottom adjustment of the weld joint.

What is claimed is:

1. In an apparatus including an open bottomed chamber formed to stradle a section of submerged pipeline and having means for introducing a pressurized gas into the chamber in order to maintain the interior thereof in a substantially dry condition, the improvement of which comprises; a rigid supporting structure in which said chamber is mounted; separate pipe clamping shoes located externally of the chamber on opposite sides thereof and mounted on each end of said support structure for engaging the pipeline, and means connected to said clamping shoes for automatically adjusting said shoes to accommodate for minor bends in the pipeline.

2. Apparatus as claimed in claim 1 wherein said connecting means comprises a plurality of pressure actuated pistons and cylinders, each piston having one of said clamping shoes connected thereto for engaging the pipeline.

3. Apparatus as claimed in claim 2 wherein the chamber is supported upon a frame and said cylinders are supported by said frame, said cylinders being provided in pairs with the pistons in each pair generally facing one another for engaging opposite sides of the pipeline.

4. Apparatus as claimed in claim 3 wherein two pairs of cylinders are provided on each side of the chamber, a common elongated clamping shoes being pivotally connected to the pistons on each side of the chamber in order to adjust to minor horizontal bends in the pipeline.

5. Apparatus as claimed in claim 4 wherein the cylinders of one of said pairs on each side of the chamber are pivotally mounted upon the frame in order to adjust the minor vertical bends in the pipeline.

6. Apparatus as claimed in claim 3, further including at least one vertical cylinder supported by the frame for producing a vertical movement in the pipeline.

References Cited

UNITED STATES PATENTS

| 2,939,292 | 6/1960 | Law | 61—63 |
| 3,328,970 | 7/1967 | Giampelluca | 61—69 |
| 3,407,611 | 10/1968 | Coultrup | 61—69 |
| 3,407,612 | 10/1968 | Pearce | 61—81 |

J. KARL BELL, Primary Examiner

U.S. Cl. X.R.

61—72.3